US012704223B2

(12) United States Patent
Gondrand et al.

(10) Patent No.: US 12,704,223 B2

(45) Date of Patent: Aug. 11, 2026

(54) INSTALLATION AND METHOD FOR STORING LIQUEFIED GAS

(71) Applicant: L'Air Liquide, Societe Anonyme pour l'Etude et l'Exploitation des Procedes Georges Claude, Paris (FR)

(72) Inventors: Cecile Gondrand, Sassenage (FR); Fabien Durand, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 196 days.

(21) Appl. No.: 18/833,788

(22) PCT Filed: Dec. 7, 2022

(86) PCT No.: PCT/EP2022/084798

§ 371 (c)(1),
(2) Date: Jul. 26, 2024

(87) PCT Pub. No.: WO2023/143793

PCT Pub. Date: Aug. 3, 2023

(65) Prior Publication Data

US 2024/0384837 A1 Nov. 21, 2024

(30) Foreign Application Priority Data

Jan. 28, 2022 (FR) ...................................... 2200726

(51) Int. Cl.
*F17C 1/00* (2006.01)

(52) U.S. Cl.
CPC ...... *F17C 1/002* (2013.01); *F17C 2205/0142* (2013.01); *F17C 2205/0326* (2013.01);
(Continued)

(58) Field of Classification Search
CPC ...... F17C 1/002; F17C 13/004; F17C 13/026; F17C 2250/043; F17C 2250/0491; F17C 2265/03; F17C 2270/0105
See application file for complete search history.

(56) References Cited

U.S. PATENT DOCUMENTS 8,256,230 B2 9/2012 An et al.
8,820,096 B2 * 9/2014 Lee ...................... F17C 13/004 62/50.7
(Continued)

FOREIGN PATENT DOCUMENTS

EP 3 510 317 7/2019
FR 2 880 942 7/2006
(Continued)

OTHER PUBLICATIONS

International Search Report and Written Opinion for PCT/EP2022/084798, mailed Mar. 13, 2023.

*Primary Examiner* — Filip Zec

(74) *Attorney, Agent, or Firm* — Justin K. Murray

(57) ABSTRACT

An installation and method for storing liquefied gas, comprising a plurality of separate storage tanks each configured to contain liquefied gas, comprising a cooling circuit provided with a refrigeration device, a withdrawal pipe and a plurality of first injection pipes towards each of the tanks in order to cool the withdrawn fluid flow, the tanks comprising a degassing line, the installation comprising a set of controlled valves situated at least in the cooling circuit, wherein the first tank contains liquid and at least one other tank is empty, containing essentially boil-off gas, that is to say containing little or no liquid, wherein there is cooling of the fluid contained in the first tank, re-injection into the first tank, injection of liquid cooled by the refrigeration device
(Continued)

into at least one other empty tank and transfer of boil-off gas generated in the or the other tanks to the first tank.

13 Claims, 2 Drawing Sheets

(52) U.S. Cl.
CPC .............................. *F17C 2221/033* (2013.01); *F17C 2223/0161* (2013.01); *F17C 2227/0157* (2013.01); *F17C 2227/0355* (2013.01); *F17C 2250/043* (2013.01); *F17C 2250/0439* (2013.01); *F17C 2265/03* (2013.01); *F17C 2270/0105* (2013.01)

(56) References Cited

U.S. PATENT DOCUMENTS

| | | | | |
|---|---|---|---|---|
| 10,012,350 | B2 * | 7/2018 | Le Bruchec | F17C 7/02 |
| 10,267,457 | B2 * | 4/2019 | Nelson | B63B 25/16 |
| 10,654,552 | B2 * | 5/2020 | Lee | F17C 9/00 |
| 11,300,355 | B2 * | 4/2022 | Tezuka | F25J 1/023 |
| 11,402,152 | B2 * | 8/2022 | Christensen | F25J 1/0072 |
| 11,549,646 | B2 | 1/2023 | Bernhardt et al. | |
| 11,698,169 | B2 * | 7/2023 | Hodgson | F17C 13/002 62/48.1 |
| 11,808,411 | B2 * | 11/2023 | Lee | F04B 15/08 |
| 11,879,598 | B2 | 1/2024 | Lombard et al. | |
| 12,460,860 | B2 * | 11/2025 | Tanaka | F25J 1/001 |
| 2005/0005831 | A1 * | 1/2005 | Krason | B63B 25/12 114/74 R |
| 2006/0156758 | A1 * | 7/2006 | An | F25J 1/0045 62/613 |
| 2010/0000253 | A1 * | 1/2010 | Fuchs | F25J 1/0045 62/613 |
| 2015/0000334 | A1 * | 1/2015 | Edwards | F25J 1/0278 62/611 |
| 2021/0164728 | A1 | 6/2021 | Borisevich et al. | |

FOREIGN PATENT DOCUMENTS

| | | |
|---|---|---|
| FR | 3 066 248 | 11/2018 |
| WO | WO 2019/092331 | 5/2019 |

* cited by examiner

[Fig. 1]
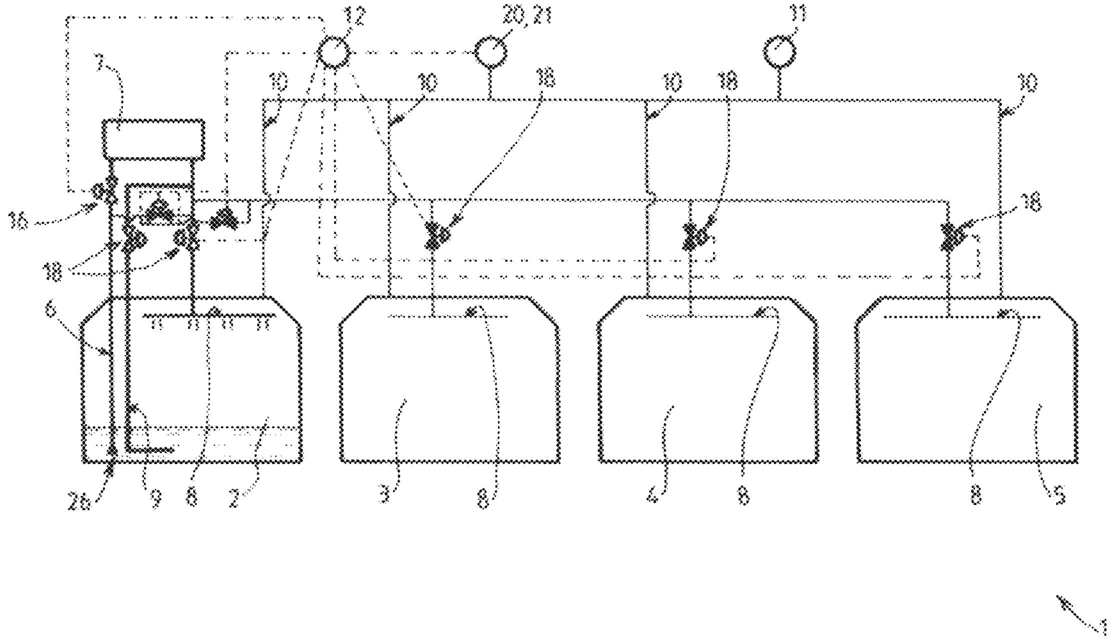
[Fig. 2]
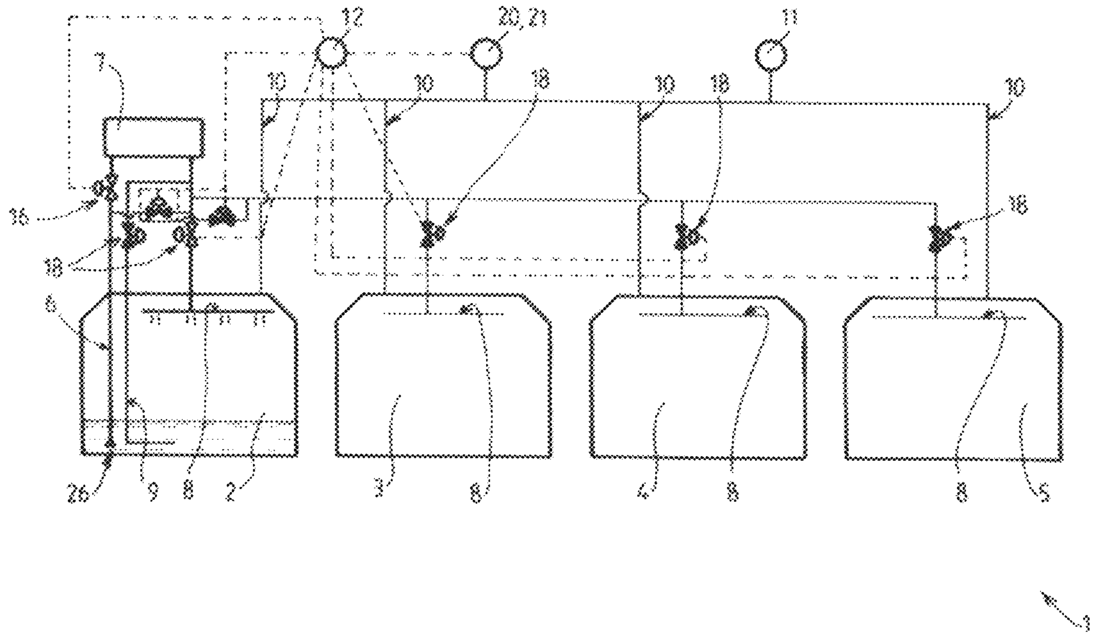

[Fig. 3]
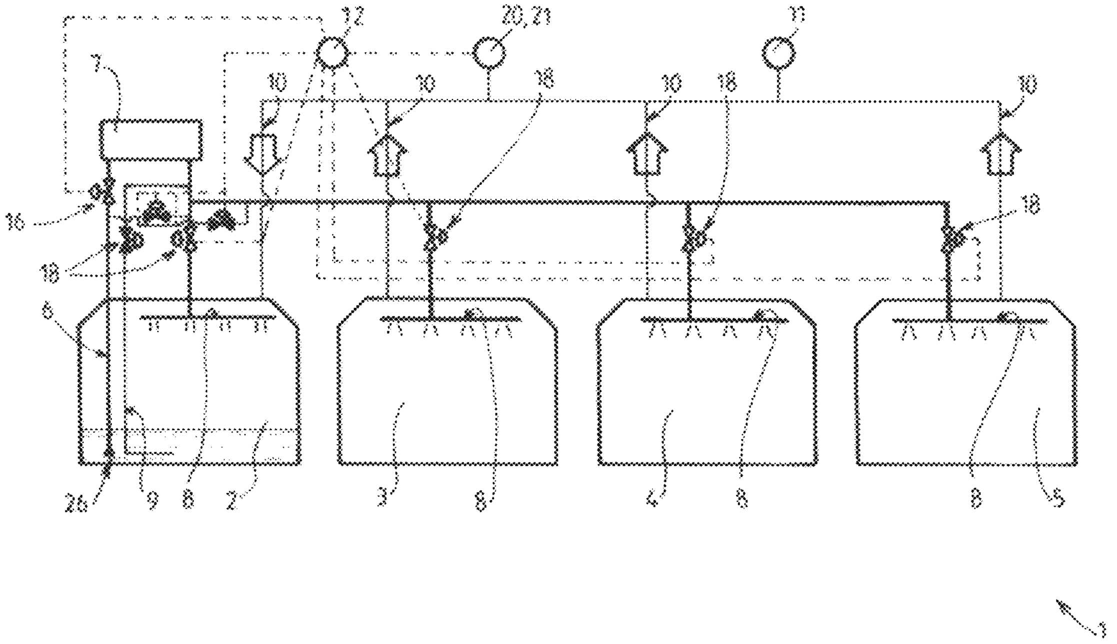
[Fig. 4]
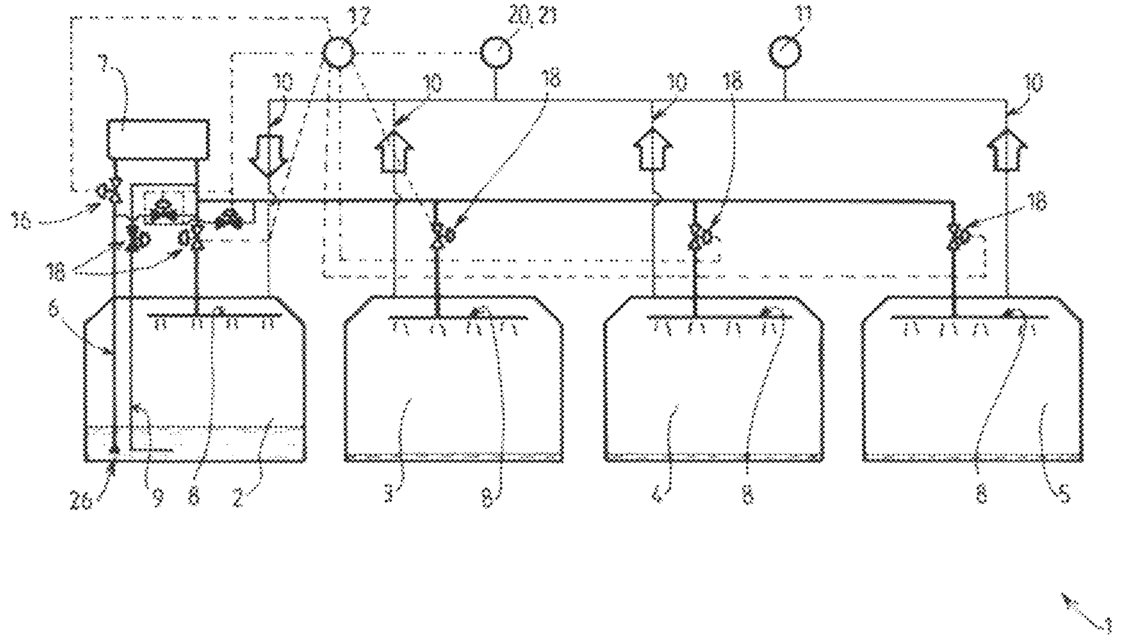

INSTALLATION AND METHOD FOR STORING LIQUEFIED GAS

CROSS REFERENCE TO RELATED APPLICATIONS

This application is a § 371 of International PCT Application PCT/EP2022/084798, filed Dec. 7, 2022, which claims the benefit of FR2200726, filed Jan. 28, 2022, both of which are herein incorporated by reference in their entireties.

FIELD OF THE INVENTION

The invention relates to an installation and a method for storing liquefied gas, for example liquefied natural gas.

The invention may relate in particular to the storage and transportation of liquefied natural gas on-board methane tankers, for example.

SUMMARY OF THE INVENTION

In certain embodiments, the invention may relate more specifically to a storage installation for liquefied gas, for example liquefied natural gas, in particular on board a ship, comprising several separate storage tanks each designed to contain the liquefied gas, each tank comprising a lower portion intended to contain the liquefied gas in liquid state, and an upper portion intended to contain the vapors from the liquefied gas, the installation comprising a cooling circuit provided with a refrigeration device, the cooling circuit comprising a withdrawal line comprising a first end opening into the lower portion of a first tank and a second end connected to an inlet of the refrigeration device, the cooling circuit comprising a plurality of first injection lines connecting an outlet of the refrigeration device to each of the tanks respectively, the refrigeration device being designed to cool the fluid flow circulating between the inlet and outlet thereof.

In certain embodiments, the invention may also relate in particular to the operation of cooling a methane tanker (with several storage tanks) during liquefied natural gas loading operations (filling).

See e.g., document EP3510317A1.

The invention is intended to reduce or prevent the generation of boil-off gas during this operation.

A known solution involves injecting empty tanks with liquefied gas pumped from a full tank or a tank containing residual liquid. However, this generates boil-off gases in the empty tank to be cooled. These boil-off gases are either lost (discharged through vents or used to propel the ship or burned in a flare) or have to be conveyed to a liquefaction unit to be reinjected into one of the tanks.

The first solution results in a loss of product, while the second solution is costly and notably requires boil-off gas compressors to reliquefy said gases.

One objective of this invention is to mitigate some or all of the drawbacks of the prior art as set out above.

For this purpose, the installation according to certain embodiments of the invention, which otherwise corresponds to the general definition given in the preamble above, may include a plurality of storage tanks, with each storage tank comprising a degassing line having a first end connected to the upper portion of the tank and a second end connected to at least one recovery zone, the degassing line of each tank other than the degassing line of the first tank comprising a third end connected to the upper portion of the first tank, the installation comprising a set of controlled valves located at least in the cooling circuit and an electronic control member for said valves, the control member being configured to command the opening and closing of the valves to cool the fluid contained in the first tank via the cooling circuit by drawing liquid from the first tank, cooling this drawn liquid in the refrigeration device and reinjecting this liquid into the first tank, the control member being further configured to inject the liquid cooled in the refrigeration device into at least one other empty tank via the first injection line or lines and to transfer the boil-off gas generated in this or these other empty tanks to the first tank via the third end or ends of the degassing line.

Furthermore, the embodiments of the invention may have one or more of the following features:

- each first injection line comprises a first end connected to the outlet of the refrigeration device and a second end opening into an upper portion of a tank,
- the cooling circuit comprises a second injection line connecting the outlet of the refrigeration device to the lower portion of the first tank,
- the control member is configured to command the opening and closing of the set of valves to cool the fluid contained in the first tank by reinjecting the cooled liquid via the first injection line and/or the second injection line,
- the installation comprises a set of pressure sensors in the tanks, the control member being configured to command the opening and closing of the valves to distribute the cooled liquid flow reinjected into the first tank between the first injection line and the second injection line as a function of the pressure level measured by the set of pressure sensors,
- the installation comprises a set of temperature sensors for the fluid in the tanks, the control member being configured to command the opening and closing of the valves as a function of the temperature level measured by the set of temperature sensors.

The invention also relates to a method for cooling tanks in an installation for storing liquefied gas comprising several separate storage tanks each designed to contain the liquefied gas, each tank comprising at least a lower portion intended to contain the liquefied gas in liquid state, and at least an upper portion intended to contain the vapors from the liquefied gas, the installation comprising a cooling circuit provided with a refrigeration device, the cooling circuit comprising a withdrawal line comprising a first end opening into the lower portion of a first tank and a second end connected to an inlet of the refrigeration device, the cooling circuit comprising a plurality of first injection lines connecting an outlet of the refrigeration device respectively to each of the tanks, the refrigeration device being designed to cool the fluid flow circulating between the inlet and outlet thereof, each of the tanks comprising a degassing line comprising a first end connected to the upper portion of the tank and a second end connected to at least one recovery zone, the degassing line of each tank other than the degassing line of the first tank comprising a third end connected to the upper portion of the first tank, the installation comprising a set of controlled valves located at least in the cooling circuit, in which the first tank contains liquid and at least one other tank is empty, essentially containing the boil-off gas, i.e. containing little or no liquid, the method comprising: a step of cooling the fluid contained in the first tank via the cooling circuit by drawing liquid from the first tank, cooling this liquid in the refrigeration device and reinjecting this liquid into the first tank, a step of injecting liquid cooled in the refrigeration device into at least one other empty tank, and a step of transferring boil-off gas generated in the other tank or tanks into the first tank.

According to possible particular features:

- during the cooling step, the fluid contained in the first tank is cooled to a temperature equal to or less than the saturation temperature of the fluid at the pressure in the tank,
- the step of transferring boil-off gas to the first tank is carried out by pressure balancing and/or via a pumping member such as a compressor,
- the step of injecting cooled liquid into at least one other empty tank and the step of transferring boil-off gas generated in the other tank or tanks into the first tank are carried out at least partially simultaneously,
- the step of injecting cooled liquid into at least one other empty tank is carried out until the fluid in the other tank or tanks reaches a given temperature, for example a temperature that may be as low as a temperature equal to or less than the saturation temperature of the fluid at the pressure in the tank,
- the method comprises, following the step of injecting cooled liquid into at least one other empty tank, a step of filling at least one of the other tanks with the liquefied gas,
- the fluid is liquefied natural gas.

The invention may also relate to any alternative device or method comprising any combination of the features above or below within the scope of the claims.

BRIEF DESCRIPTION OF THE DRAWINGS

The invention will be understood better from reading the following description and from studying the accompanying figures. These figures are given only by way of illustration and do not in any way limit the invention.

FIG. 1 is a schematic partial view illustrating a possible example embodiment of the structure and of the operation of an installation according to the invention in a first operating configuration.

FIG. 2 is a similar view of the installation in a second operating configuration.

FIG. 3 is a similar view of the installation in a third operating configuration.

FIG. 4 is a similar view of the installation in a fourth operating configuration.

DETAILED DESCRIPTION OF THE INVENTION

The illustrated liquefied gas storage installation 1 comprises several separate storage tanks 2, 3, 4, 5 each designed to contain the liquefied gas, in particular the liquefied natural gas (four in this nonlimiting example).

Each tank 2, 3, 4, 5 conventionally comprises a lower portion intended to contain the liquefied gas in liquid state and an upper portion intended to accommodate the vapors from the liquefied gas.

The installation 1 further comprises a cooling circuit provided with a refrigeration device 7. The cooling circuit comprises at least one withdrawal line 6 comprising a first end opening into the lower portion of a first tank 2 and a second end connected to an inlet of the refrigeration device 7.

The withdrawal line 6 may in particular include a pump 26 intended to aspirate the liquid in the first tank 2.

The cooling circuit comprises cooled-fluid injection lines 8 connecting an outlet of the refrigeration device 7 to each of the tanks 2, 3, 4, 5 respectively.

The refrigeration device 7 is designed to cool, and notably to subcool where applicable, the fluid flow circulating between the inlet and outlet thereof.

For example, the refrigeration device 7 comprises a cryogenic refrigerator with a refrigeration cycle for a cycle gas in a working circuit. The cycle gas for example comprises a pure gas or a gas mixture (for example nitrogen, neon, argon, helium, hydrogen or a mixture thereof). The working circuit of the refrigerator 7 comprises a member for compressing the cycle gas (for example one or more motorized compressors), a member for cooling the cycle gas (one or more cooling heat exchangers, for example), a member for expanding the cycle gas (one or more turbines and/or expansion valves) and a member for heating the cycle gas (one or more heat exchangers). The work of at least one of the turbines is preferably transferred to a compressor via a shared drive shaft. Heating and cooling can especially be effected at least in part by one or more countercurrent exchangers in which two separate portions of the cycle gas circulate under different thermodynamic conditions (especially temperature).

In other words, the working circuit of the refrigerator may be configured to subject the working gas to a thermodynamic cycle that produces, at one end of the working circuit, a cooling capacity that is transferred to the fluid circuit to be cooled via one or more heat exchangers. The refrigeration device 7 may notably be a "Turbo-Brayton" device marketed by the applicant.

As illustrated, each of the tanks 2, 3, 4, 5 comprises a degassing line 10 comprising a first end connected to the upper portion of the tank and a second end connected to at least one recovery zone 11 (for example a vent to atmosphere and/or to an inlet of an engine or a gas combustion member).

The degassing line 10 of each tank 3, 4, 5 other than the degassing line of the first tank 2 also being connected (via a third end) to the upper portion of the first tank 2.

As illustrated, the degassing lines 10 of each tank 2, 3, 4, 5 may be connected in parallel via a shared line to a recovery zone 11. This also creates a fluidic link between upper portions of all the tanks 2, 3, 4, 5 via the degassing lines 10 (enabling the transfer of boil-off gas from one tank to the other, as required and as described below).

The installation 1 comprises a set of valves 16, 18, for example controlled valves, located at least in the cooling circuit. The set of valves is in particular designed to enable the targeted cooling of the tank or tanks 2, 3, 4. The set of valves is preferably controlled (opened/closed) by an electronic control member 12, for example comprising a microprocessor.

The control member 12 may in particular be configured to command the opening and closing of the valves to cool the fluid contained in the first tank 2 via the cooling circuit.

This cooling may be carried out by drawing liquid from the first tank 2 via the withdrawal line 6, then cooling this drawn liquid by means of a heat exchange with a cold portion of the refrigerator 7, then reinjecting this cooled liquid into the first tank 2 via the injection line 8. As illustrated, the injection line 8 comprises a first end connected to the outlet of the refrigeration device 7 and a second end opening into an upper portion of the tank 2, for example in the form of one or more nozzles opening into the upper portion of the tank. In other words, the injection member injects the subcooled liquefied gas into the vapor phase, i.e. above the level of the liquefied gas in liquid state.

Some or all of the other tanks 3, 4, 5 preferably also comprise such an injection line 8 connected to the outlet of the refrigeration device 7 and a second end opening into an upper portion of the tank 2.

In the arrangement shown in FIG. 1, the first tank 2 still contains liquid, but the other tanks 3, 4, 5 are empty and relatively hotter (little or no liquid). In the case of liquefied natural gas, the temperature of the gas in these other empty tanks 3, 4, 5 may be greater than −130° C. and for example between −130° C. and +30° C. In each of these tanks 2, 3, 4, 5, the pressure is lower than the set pressure of the safety valve (not shown, for the sake of simplicity). Typically, the pressure in each of the tanks is maintained below a given value in the order of several hundred millibars (gauge pressure) above atmospheric pressure or several bars (depending on the nature of the tanks).

In a first phase or step, the content of the first tank 2 may be cooled or subcooled as mentioned above.

Liquid may be pumped from the first tank 2 via the withdrawal line 6 then cooled by the refrigerator 7 before being reinjected into the first tank 2 via the injection line 8 (corresponding valves 16, 18 open).

This means that, preferably, before cooling of the other empty tanks 3, 4, 5 begins, the first tank 2, which still contains liquid, is completely cooled, preferably to or below the saturation temperature. For example, the refrigeration device 7 may be designed to cool the liquefied gas coming from the tank 2 to a temperature of between 35 K and 150 K, for example to 110 K or 80 K (and for example at a rate of between 5 $m^3/h$ et 50 $m^3/h$).

To prevent or limit the possible generation of boil-off gas in the first tank 2 during this step, the flow of (sub) cooled liquid reinjected may be distributed between the upper part and/or the lower part of the tank 2.

For this purpose and as illustrated, the installation 1 may have (at least for the first tank 2) a second injection line 9 connecting the outlet of the refrigeration device 7 to the inside of the first tank 2, for example opening into the lower portion of the first tank 2. Furthermore, the set of valves comprises at least one valve designed to control the reinjection of the cooled liquid via the first injection line 8 and/or the second injection line 9 (see FIG. 1).

It should be noted that the second injection line 9 may be designed (one or several other separate second injection lines 9 may be provided) to enable the cooled (or supercooled) liquid to be injected into this or these other tanks.

If the pressure in the tank 2 increases excessively (for example above a given level), the cooled liquid is reinjected mainly or exclusively (see FIG. 2) into the upper part of the tank 2 (via the first injection line 8). Conversely, if the pressure drops (for example below a given level), the cooled liquid is reinjected for example mainly or exclusively into the lower part of the tank 2 (via the second injection line 9).

Preferably, at the beginning of this cooling phase of the first tank 2, approximately 10% of the cooled liquid flow is reinjected via the first injection line 8.

This detection of the pressure level and/or variations therein may be carried out by at least one sensor 20 measuring the pressure in the tank 2, for example in the degassing line 10.

Once the first tank 2 has been sufficiently cooled (saturation temperature or below), the (sub) cooled liquid contained in the first tank 2 may be injected into the other empty tank or tanks to cool said tanks (simultaneously or successively).

As illustrated in FIG. 3, the cooled liquid coming out of the refrigeration device 7 may be injected simultaneously into the first tank 2 and into some or all of the other tanks via the respective second injection lines 8 (corresponding valves 18 open).

Thus, the installation 1 enables the empty tanks 3, 4, 5 to be injected with the subcooled liquid drawn from the first tank 2, which is not empty. The boil-off gases generated when the cold liquid is injected into the empty tanks are aspirated and returned to the first tank, which contains liquid and which is subcooled. The solution provides for the option of returning the subcooled liquid into each of the tanks 3, 4, 5 separately. This may be done using a distribution valve for each tank, or any other suitable means.

Injecting cold liquid into the empty tanks 3, 4, 5 generates boil-off gases in the relatively hotter tanks 3, 4, 5. These boil-off gases are returned to the cold first tank 2 via the degassing lines 10 connected to the first tank 2. These boil-off gases are aspirated by the first tank 2 by pressure differential (or are forced where necessary). These boil-off gases are cooled and recondensed at least partially in the cold environment of the first tank 2.

The cooled liquid flow injected into the hot tanks 3, 4, 5 may be regulated as a function of the pressure in these tanks.

For example, in the event of an excessive pressure increase (for example above a given level), the liquid flow injected may be relatively reduced. In the event of relatively low or diminishing pressure, the liquid flow injected may be relatively increased.

This process of cooling the tanks 3, 4, 5 may be continued until the empty tanks to be cooled are brought to a sufficiently low temperature, for example equal to or less than the saturation temperature, for example equal to or less than −130° C.

This detection of the temperature level and/or variations therein may be carried out by at least one sensor 21 measuring the temperature in the tank or tanks, for example in the degassing line 10.

Once the empty tanks have been sufficiently cooled, injecting additional liquid therein causes liquid to appear or increase in quantity in these tanks (see FIG. 4).

Advantageously, this step of cooling the empty tanks 3, 4, 5 is carried out after a discharge of liquefied gas and before subsequent filling of the tank or tanks in the installation 1.

Some or all of the valves may be valves controlled by the control member 12 in response to the signals from the pressure sensor 20 and/or the temperature sensor 21 in the installation.

The invention may be used in installations for storing liquefied natural gas or any other cryogenic gas that for example liquefies below −100° C. or an appropriate mixture. For example, biomethane, nitrogen, oxygen, argon and mixtures thereof.

The invention also relates to a transport vehicle, for example a transport ship, for transporting a liquefied gas, for example liquefied natural gas, the transport vehicle comprising such an installation.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A storage installation for liquefied gas liquefied natural gas, in particular on board a ship, the installation comprising:

- a plurality of storage tanks each designed to contain the liquefied gas, each storage tank comprising a lower portion configured to contain the liquefied gas in a liquid state, and an upper portion configured to contain vapors from the liquefied gas, wherein the plurality of storage tanks comprises a first storage tank, wherein each of the plurality of storage tanks further comprises a degassing line comprising a first end connected to the upper portion of the respective tank and a second end connected to at least one recovery zone, wherein the degassing line of each storage tank, other than the degassing line of the first storage tank, comprises a third end connected to the upper portion of the first storage tank;
- a cooling circuit provided with a refrigeration device, the cooling circuit comprising a withdrawal line comprising a first end opening into the lower portion of the first storage tank and a second end connected to an inlet of the refrigeration device, the refrigeration device being configured to cool a fluid flow circulating between the inlet and an outlet of the refrigeration device, the cooling circuit comprising a plurality of first injection lines connecting the outlet of the refrigeration device to each of the plurality of storage tanks respectively,
- a set of control valves located at least in the cooling circuit; and
- an electronic control member in communication with said control valves, the electronic control member being configured to command an opening and closing of the control valves, wherein the electronic control member comprises a processor and memory coupled to the processor, the memory storing instructions that, when executed by the processor, cause the processor to perform operations comprising:
  - cooling the fluid contained in the first storage tank via the cooling circuit by drawing liquid from the first storage tank;
  - cooling said drawn liquid in the refrigeration device to form a cooled liquid;
  - splitting the cooled liquid into a first stream and a second stream;
  - reinjecting the first stream into the first storage tank;
  - identifying an empty storage tank from the plurality of storage tanks; and
  - injecting the second stream into the identified empty storage tank via the plurality of first injection lines and transferring the boil-off gas generated in the identified empty storage tank to the first storage tank via the third end or ends of the degassing line.

2. The installation as claimed in claim 1, wherein each of the first injection lines comprises a first end connected to the outlet of the refrigeration device and a second end opening into an upper portion a respective storage tank.

3. The installation as claimed in claim 1, wherein the cooling circuit comprises a second injection line connecting the outlet of the refrigeration device to the lower portion of the first storage tank.

4. The installation as claimed in claim 3, wherein the control member is configured to command the opening and closing of the set of control valves to cool the fluid contained in the first storage tank by reinjecting the cooled liquid via the first injection line and/or the second injection line.

5. The installation as claimed in claim 4, further comprising a set of pressure sensors in the plurality of storage tanks, the control member being configured to command the opening and closing of the valves to distribute the cooled liquid flow reinjected into the first storage tank between the first injection line and the second injection line as a function of the pressure level measured by the set of pressure sensors.

6. The installation as claimed in claim 1, further comprising a set of temperature sensors for the fluid in the plurality of storage tanks, the control member being configured to command the opening and closing of the control valves as a function of the temperature level measured by the set of temperature sensors.

7. A method for cooling the plurality of storage tanks in the installation as claimed in claim 1, the method comprising the steps of:

- providing the installation as claimed in claim 1;
- cooling the fluid contained in the first storage tank via the cooling circuit by drawing liquid from the first storage tank, cooling this liquid in the refrigeration device and reinjecting this liquid into the first storage tank;
- identifying an empty storage tank from the plurality of storage tanks;
- injecting liquid cooled in the refrigeration device into the identified empty tank; and
- transferring boil-off gas generated in the identified empty storage tank into the first storage tank.

8. The method as claimed in claim 7, wherein, during the cooling step, the fluid contained in the first storage tank is cooled to a temperature equal to or less than a saturation temperature of the fluid at a pressure in the tank.

9. The method as claimed in claim 7, wherein the step of transferring boil-off gas to the first storage tank is carried out at least by one of pressure balancing and a compressor.

10. The method as claimed in claim 7, wherein the step of injecting liquid cooled in the refrigeration device into the identified empty tank and the step of transferring boil-off gas generated in the identified empty storage tank into the first storage tank are carried out at least partially simultaneously.

11. The method as claimed in claim 7, wherein the step of injecting cooled liquid into at least one other empty tank is carried out until the fluid in the other tank or tanks reaches a given temperature a temperature that may be as low as a temperature equal to or less than the saturation temperature of the fluid at the pressure in the tank.

12. The method as claimed in claim 7, further comprising, following the step of injecting cooled liquid into the identified empty tank, a step of filling at least one of the other storage tanks with the cooled liquid.

13. The method as claimed in claim 7, wherein the fluid is liquefied natural gas.

* * * * *